Feb. 6, 1923.
A. C. VAN HOOYDONK.
TROLLEY WHEEL.
FILED MAY 12, 1922.
1,444,716.
2 SHEETS—SHEET 1.
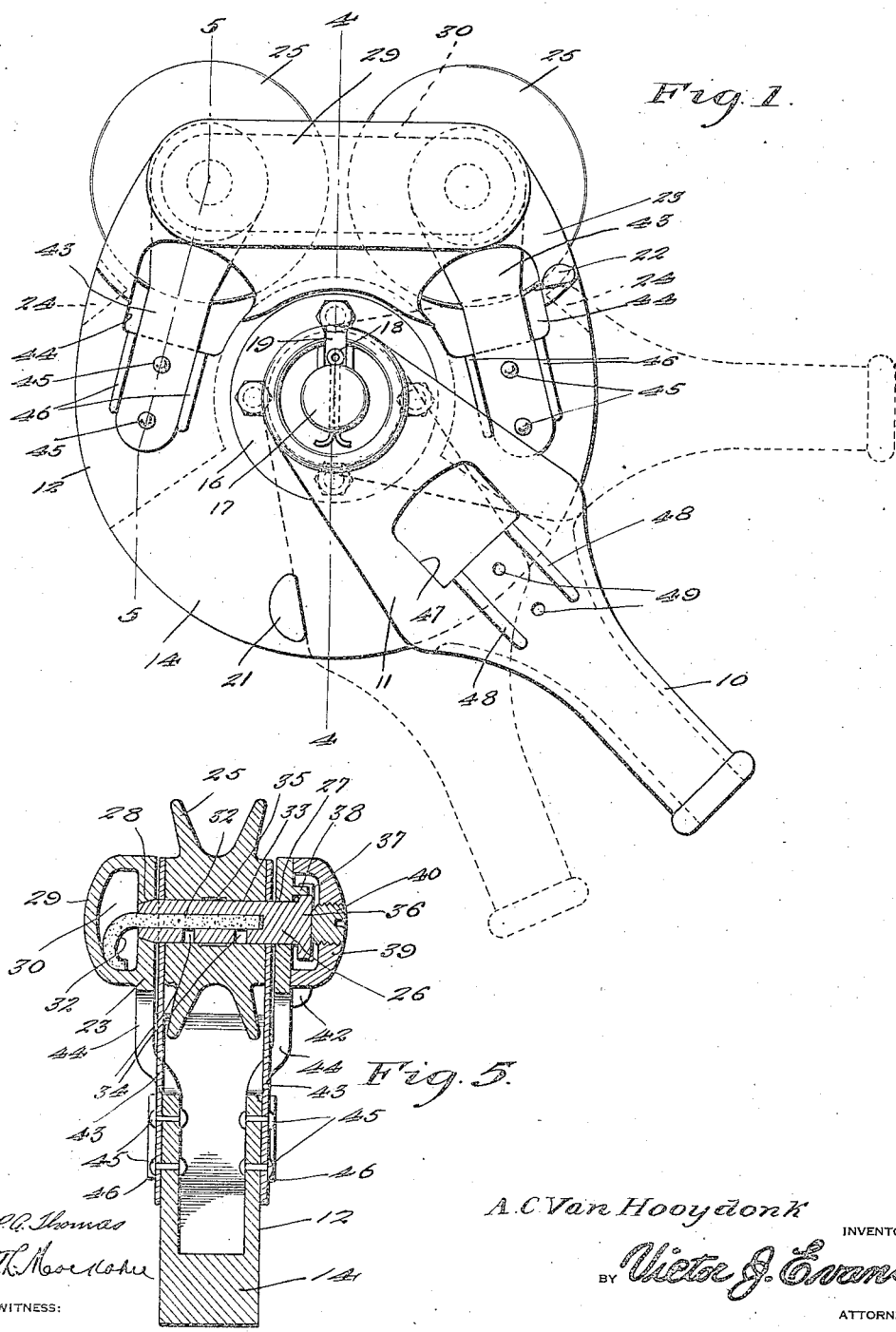
A. C. Van Hooydonk
INVENTOR
BY Victor J. Evans
ATTORNEY
WITNESS:

Feb. 6, 1923.
A. C. VAN HOOYDONK.
TROLLEY WHEEL.
FILED MAY 12, 1922.
1,444,716.
2 SHEETS—SHEET 2.
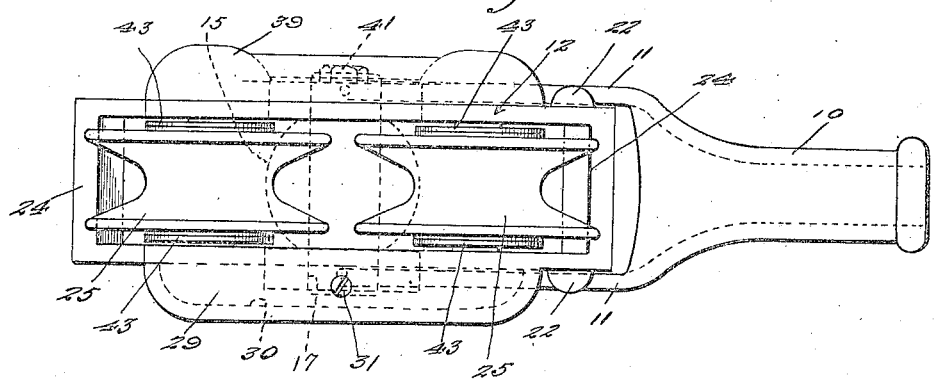
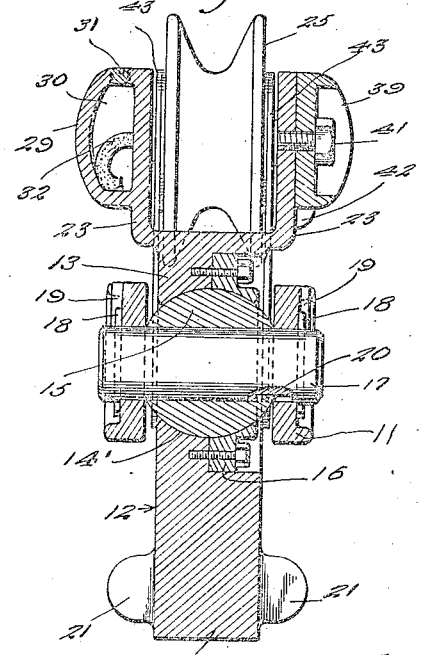
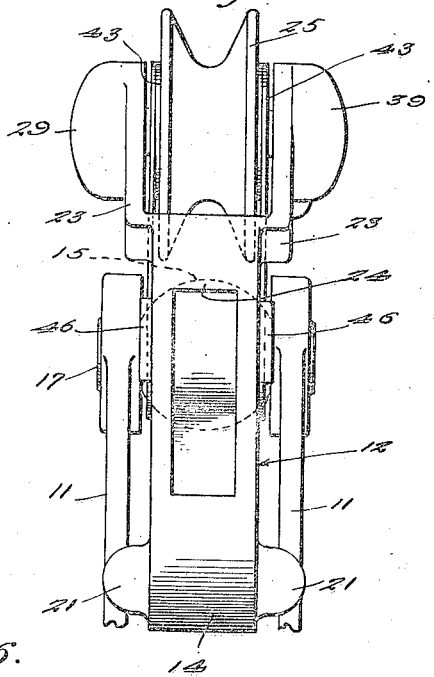
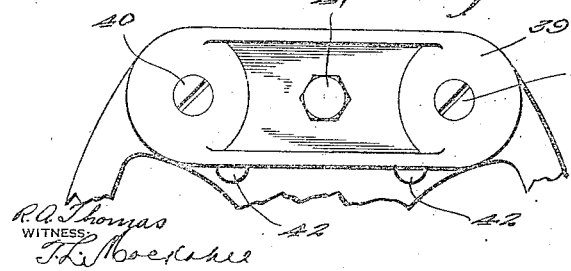
A. C. Van Hooydonk
INVENTOR
BY Victor J. Evans
ATTORNEY Patented Feb. 6, 1923.

1,444,716

UNITED STATES PATENT OFFICE.

ADRIAN C. VAN HOOYDONK, OF MONROE, MICHIGAN.

TROLLEY WHEEL.

Application filed May 12, 1922. Serial No. 560,349.

*To all whom it may concern:*

Be it known that I, ADRIAN C. VAN HOOYDONK, a subject of the Queen of Holland, residing at Monroe, in the county of Monroe and State of Michigan, have invented new and useful Improvements in Trolley Wheels, of which the following is a specification.

This invention relates to improvements in trolley wheels.

An object of the present invention is the provision of a trolley wheel which will maintain a perfect and relatively large contact surface in engagement with the trolley wire at all times and under various conditions and thus eliminate objectionable sparking and consequent burning and damage to the wire, as well as to provide a contact surface which will act as a conductor to supply sufficient power for hauling heavy trains.

Another object of the invention is the provision of a trolley wheel which will accurately follow and adapt itself to twists or bends in the wire, unevenness of the road bed, or variations in the height of the wire, maintaining proper contact under adverse conditions and in a manner to reduce friction and wear.

Another object of the invention is the provision of novel means for supplying lubricant to the trolley wheel, so that the latter will rotate freely and further reduce wear.

A further object of the invention is the provision of means for mounting the wheel or wheels so that the latter may be easily and quickly removed or replaced.

With the above and other objects in view, the invention further includes the following novel features and details of construction, to be hereinafter more fully described, illustrated in the accompanying drawings and pointed out in the appended claims.

In the drawings:—

Figure 1 is a side elevation of a trolley wheel embodying the invention.

Figure 2 is a top plan view of the same.

Figure 3 is an edge view.

Figure 4 is a vertical central sectional view taken on the line 4—4 of Figure 1.

Figure 5 is a similar view taken on the line 5—5 of Figure 1.

Figure 6 is a detail elevation showing the manner of securing the retaining cap in place.

Referring in detail to the drawings, wherein like characters of reference denote corresponding parts, the reference character 10 indicates a harp, which is adapted to be secured to the outer end of a trolley pole in the usual or any preferred manner and which includes spaced parallel arms 11. Mounted between these arms is a cage or carrier 12, the body portion of the latter being preferably formed of a casting which includes a hub 13 and a weight 14 which is disposed below the hub and acts to maintain the carrier in proper operative position. The hub 13 is provided with an opening 14' whose walls are transversely concaved as shown in Figure 4 of the drawings and this opening is adapted to receive a spherical bearing member or ball 15. This ball is held in place by means of a retaining ring 16 which is removably secured to the hub 13 by bolts or similar fastening devices and whose inner periphery is also transversely concaved and provides together with the walls of the opening 14, a transversely arcuate-shaped opening or socket within which the ball 15 is operatively retained. Extending through the ball 15 is a pin 17, whose opposite ends also extend through openings in the outer ends of the arms 11. Cotter pins or similar devices 18 pass through openings in the opposite ends of the pins 17, one end of this cotter pin being located within a socket or recess 19 provided in the opposite faces of the arms 11, so that relative movement of the pin 17 and arms 11 is prevented. Relative movement between the pin 17 and ball 15 is also prevented by means of a key 20, which extends within the opening of the ball 15 and enters a slot provided in the pin 17. Located upon the opposite sides of the cage or carrier 12 are spaced stops 21 and 22, which act to limit the relative rotary movement of the harp and cage or carrier 12, as shown by the dotted lines in Figure 1.

Extending upwardly from the hub 13 and weight 14, are spaced parallel plates 23 which are laterally and outwardly offset at their upper ends and which are connected by transversely arranged webs 24. Mounted between these plates are grooved trolley receiving wheels 25, which are held in place by bearing pins 26, the latter extending through openings 27 and 28 provided in the spaced plates 23. Extending longitudinally along the upper edge of one of the plates 23 is a hollow boss 29 which provides a lubricant chamber 30, the latter being adapted to contain a suitable lubricant to be fed to the pins 26. An opening is provided in the top of the chamber 30, whereby the lubricant may be inserted, a removable plug 31 normally closing this opening.

The pins 26 are provided with an axle bore which receives a wick 32, one end of which extends within the chamber 30, so that the lubricant therein will saturate and travel throughout the length of the wick and will pass into the bearing opening 33 of the wheels 25 through transverse openings 34. The wheels 25 are provided with an annular lubricant groove 35. The pins 26 have one of their ends tapered so as to fit within the openings 28, whose walls are also tapered and when the pins are forced within the openings 28, a leak proof joint will be provided. The opposite ends of the pins 26 are provided with heads 36 and these heads are provided with notches 37 for the reception of pins or studs 38 extending from the adjacent face of one of the plates 23, so that the pins 26 will be held against turning. Positioned over the heads of the pins 26 is an elongated cap 39 which carries threaded screws or plugs 40. One of these screws or plugs is provided for each of the pins 26 and their inner ends bear against the heads 36, so that by adjusting the screws or plugs 40, the pins may be forced into the openings 28 and held therein against accidental displacement. The cap 39 is secured to the plate 23 by means of a centrally arranged bolt or screw 41 and in order to prevent pivotal movement of this cap, the said plate is provided with spaced lugs 42 against which the lower edge of the plate engages.

In order to insure proper electrical connection between the wheels 25 and the cap or carrier 12, there are provided upon opposite sides of each of the wheels, conductor strips 43 which extend through openings 44 provided in the plates 23 and whose outer ends are provided with openings for the passage of the pins 26. The inner ends of these strips are riveted or otherwise secured as indicated at 45, between spaced lugs 46 extending from the plates 23. If desired, a similar conductor strip may be provided for connecting the bearing pin 15 with the opposite arms 11 of the harp and for this purpose the arms 11 are each provided with an opening 47, at one end of which there are provided spaced lugs 48 and openings 49.

When in use, the wheels 26 will accurately follow any curve in the trolley wire and will adjust themselves to either vertical or lateral offset portions or kinks of the trolley wire due to the free pivotal movement of the cage or carrier 12 and the lateral or universal movement of the connection between this cage or carrier and the harp 10. By providing two wheels as shown and described, when the leading wheel engages the offset or kink, the following wheel will be riding in normal contact with the wire and as soon as the last mentioned wheel engages this offset or kink, the leading wheel will have passed thereover and will resume its normal contact with the wire. Due to the free movement of the cage or carrier in any direction, positive contact may be maintained with the wire without undue pressure, so that wear upon the wire is materially reduced and sparking and consequent burning of the wire eliminated. By the arrangement and disposition of the weight 14, proper equilibrium is maintained and as both of the wheels are in contact with the wire a large contact surface is obtained so as to provide a proper conductor for a flow of current sufficient to supply power for a heavy train.

The invention is susceptible of various changes in its form, proportions and minor details of construction and the right is herein reserved to make such changes as properly fall within the scope of the appended claims.

Having described the invention what is claimed is:—

1. In a trolley wheel, a universally movable carrier comprising a central hub portion, spaced parallel plates extending upwardly from the hub portion, a weight extending downwardly from the hub portion and connecting the plates, and spaced wire-engaging wheels rotatably mounted between the spaced plates.

2. In a trolley wheel, a bifurcated harp, a carrier positioned within the bifurcated portion of the harp, a wire-engaging wheel mounted upon the carrier and a ball and socket connection between the carrier and the harp.

3. In a trolley wheel, the combination with a harp, of a carrier, a wire-engaging wheel mounted upon the carrier, a pin connecting the outer ends of the harp and a ball mounted upon the pin and a bearing provided in the carrier for receiving the ball.

4. In a trolley wheel, a universally movable carrier comprising a central hub portion, a weight depending therefrom, spaced parallel plates extending upwardly from the hub portion and weight, a wire-engaging wheel mounted between the plates, a bearing pin extending through the wheel and plates, and means carried by the plates whereby the bearing pins may be supplied with a lubricant.

5. In a trolley wheel, a universally movable carrier comprising a central hub portion, a weight depending therefrom, spaced parallel plates extending upwardly from the hub portion and weight, spaced wire-engaging wheels located between the plates, bearing pins extending through the wheels and plates, means carried by one of the plates and engaging the bearing pins to prevent rotation of the latter and means disposed axially of and engaging one end of the pins to hold the latter against longitudinal movement.

6. In a trolley wheel, a universally movable carrier comprising a central hub portion, a weight depending therefrom, spaced parallel plates extending upwardly from the hub portion, and weight, spaced wire-engaging wheels located between the plates, bearing pins extending through the wheels and plates and each of said pins having one of their ends tapered and disposed within a tapered opening in one of the plates and adjustable means engaging the bearing pins to force the latter within the tapered openings.

In testimony whereof I affix my signature.

ADRIAN C. VAN HOOYDONK.